Dec. 18, 1962 J. E. WORSHAM ETAL 3,068,644
AERODYNAMIC JET NOZZLE
Filed June 28, 1955
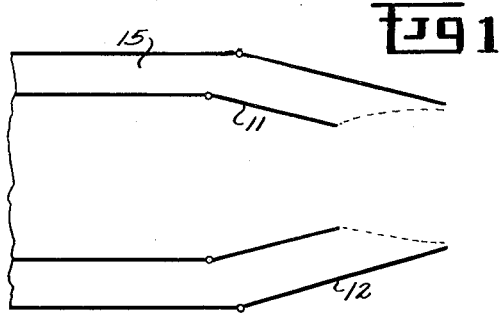
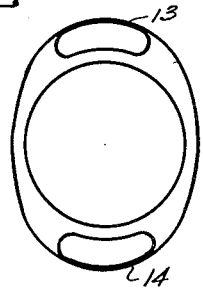
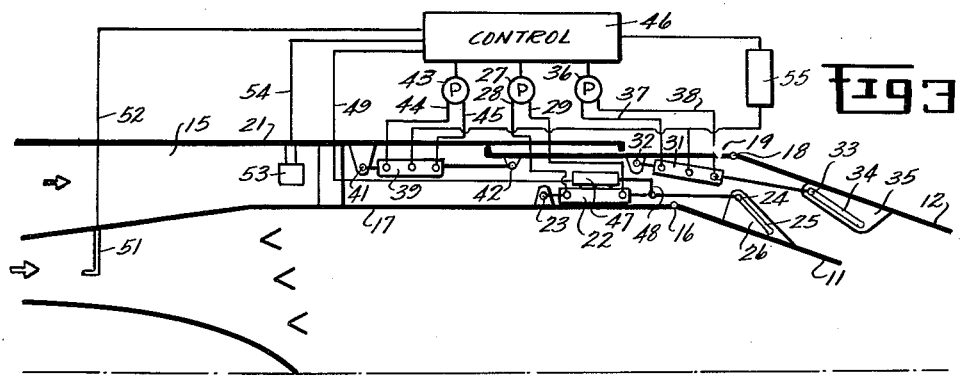
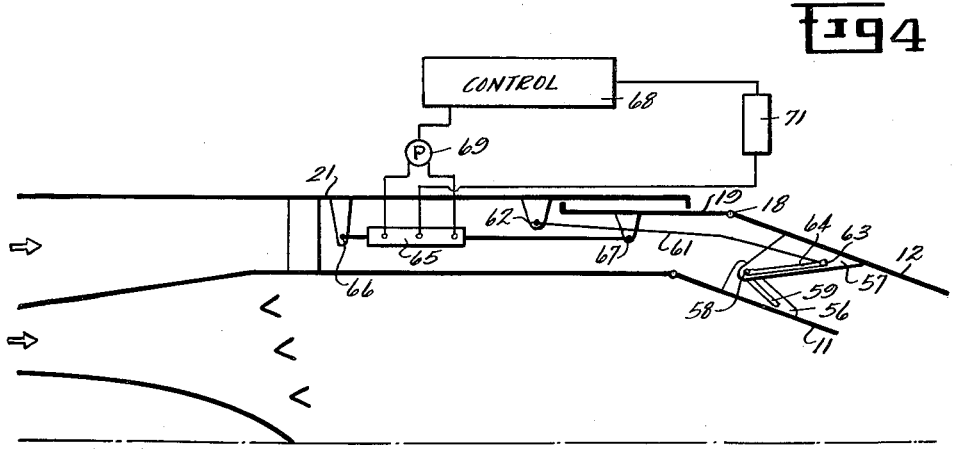
INVENTORS.
JAMES E. WORSHAM
ROBERT W. GILLIOM
BY
Edward M. Little
THEIR ATTORNEY—

United States Patent Office 3,068,644
Patented Dec. 18, 1962

3,068,644
AERODYNAMIC JET NOZZLE
James Everett Worsham, Glendale, and Robert Waite Gilliom, Cincinnati, Ohio, assignors to General Electric Company, a corporation of New York
Filed June 28, 1955, Ser. No. 518,543
6 Claims. (Cl. 60—35.6)

The present invention relates to an aerodynamic nozzle and, more particularly, to an aerodynamic convergent-divergent jet nozzle of variable geometry.

The exhaust nozzle of a turbojet or turbofan engine has as its purpose the transformation of the pressure and thermal energy of the discharge gases into velocity, the thrust of the engine being directly proportional to the increase in velocity of the gas from the entrance of the engine to the exit plane of the nozzle. It is of utmost importance, therefore, that maximum velocity increase be obtained. At subsonic flight speeds this increase in velocity can be obtained from passing the exhaust gases through a converging passage until sonic velocity is obtained. However, to increase the gas velocity beyond sonic, as is required at supersonic flight speeds, the nozzle downstream of the sonic velocity plane must increase in area. Therefore, at nozzle pressure ratios greater than the ratio for sonic velocity (approximately 1.89) a nozzle must have a passage that at first converges to a minimum throat area, and then diverges from the throat to the exit plane. As the pressure ratio across the nozzle increases, the divergence requirement for optimum thrust increases. Present day turbojet engines operate over a wide range of nozzle pressures and the temperatures of the exhaust gases vary widely, which means that to provide optimum performance, the throat area of the nozzle must be adjustable to accommodate the overall variation of both pressure and temperatures of the exhaust gases. In addition, optimum performance of the engine requires that both expansion ratio (ratio of the exit diameter to the throat diameter) and the spacing ratio (ratio of the length of the diverging passage to the throat diameter) increase with increasing pressure ratio.

Heretofore, attempts to provide a satisfactory convergent-divergent nozzle have generally been directed toward the use of plugs (fixed or movable) or mechanical nozzles in which both the converging and the diverging portions are formed mechanically. Neither of these general types have been completely successful since the plug types are inherently large in size and have objectionable space requirements, while the mechanical nozzles necessitate unduly complex actuating mechanisms. In addition, both types have inherent cooling and weight problems which militate against their use in aircraft.

The present invention overcomes the disadvantages of the prior known nozzles by provision of an aerodynamic convergent-divergent nozzle having primary nozzle flaps which define the throat area and secondary or shroud flaps positioned concentrically therewith which define the exit area, the convergent passage being formed mechanically by the primary flaps and the divergent passage being formed aerodynamically by secondary air which flows around the outside of the engine and through the annular passage between the primary and secondary flaps. Optimum thrust characteristics over a wide range of pressure ratios are facilitated by adjustment of the expansion ratio and spacing ratio for varying operating conditions. In addition to the advantages of light weight, small size and simplicity of actuation mechanism, the aerodynamic nozzle of the present invention provides cooling air for accessory cooling with no loss in performance.

A primary object of the present invention is the provision of an improved aerodynamic convergent-divergent nozzle in which the convergent passage is produced mechanically and the divergent passage is formed by an air boundary.

A further object is the provision of an aerodynamic convergent-divergent nozzle in which the spacing ratio and expansion ratio are both variable to provide optimum performance over the entire operating range of the engine.

Other objects and many of the attendant advantages of this invention will be readily appreciated as the same becomes better understood by reference to the following detailed description when considered in connection with the accompanying drawing wherein:

FIGURE 1 is a schematic view illustrating the principle of the aerodynamic convergent-divergent nozzle;

FIGURE 2 is an elevation view of the forward end of a jet engine showing the secondary air intakes;

FIGURE 3 is a partial cross-sectional view of a desired embodiment of the present invention;

FIGURE 4 is a partial cross-section view of another embodiment of the invention.

Referring more particularly to FIGURE 1 of the drawing, the aerodynamic convergent-divergent nozzle consists essentially of the nozzle flaps 11 which define the primary nozzle through which the engine gases flow and the shroud flaps 12 which define a secondary nozzle through which the secondary air is directed. The convergent portion of the present nozzle is thus formed mechanically by the nozzle flaps 11 while the divergent portion of the nozzle is formed by the secondary air which creates an air boundary illustrated in dotted lines between the ends of the nozzle flaps and the shroud flaps. The air boundary can be positioned for optimum performance over a wide range of operating conditions by varying the expansion ratio and the spacing ratio of the aerodynamic nozzle.

As shown in FIGURE 2, the secondary air intakes 13 and 14 supply air to the secondary air passage 15. While the secondary air is illustrated as being picked up through separate intakes at the forward end of the engine, it may be derived from other sources such as, the primary engine air intake, since secondary air is acceptable from anywhere as long as the pressure of the air is equal to, or higher than, that required to cause the secondary air flow to form the air boundary shown in FIG. 1, i.e., the pressure must be sufficient to effect an increase in the expansion ratio as speed increases and a decrease in the expansion ratio as speed decreases to near sonic.

The completely variable embodiment of the present invention shown in FIGURE 3 produces optimum performance for any flight condition since the expansion ratio and spacing ratio are both varied independently. In this embodiment the nozzle flaps 11 are pivotally connected as at 16 to the tail pipe 17, and the shroud flaps 12 are pivotally connected as at 18 to the shroud 19 which is mounted on the outer casing 21 for longitudinal movement thereof. A primary nozzle actuating means is provided for controlling the primary nozzle in response to the engine parameters of rotor speed, throttle setting, compressor inlet temperature and turbine discharge temperature. Such means includes an hydraulic actuator 22 consisting of a cylinder secured to the tailpipe as at 23, and a piston received in the cylinder with the piston rod attached to the nozzle flap as by a ring 24 received in the slot 25 of the bracket 26. A pump 27 is connected to the hydraulic actuator 22 by hydraulic lines 28 and 29 for applying hydraulic pressure to one side or the other of the piston, thus positioning the nozzle flaps. A second hydraulic actuator 31, similar to actuator 22, is connected to the shroud 19 as at 32 and to the shroud flaps 12 by a ring 33 received in the slot 34 in the bracket 35. The actuator 31 is controlled by a pump 36 connected thereto by the hydraulic lines 37 and 38. A third hydraulic actuator 39, similar to actuators 22 and 31, is connected to the outer casing 21 as at 41 and to the shroud 19 as at 42. The actuator 39 is controlled by the pump 43 which is connected thereto by the hydraulic lines 44 and 45. The control 46 combines measurements of rotor speed, pilot's throttle setting, compressor inlet temperature and turbine discharge temperature to activate pump 27 which operates the hydraulic actuator 22 to position the nozzle flaps 11. A position sensing means 47 is connected to the actuator 22 as by lever 48 and to the control 46 by lead 49, said means furnishing signals of primary nozzle position to the control 46. A turbine discharge pressure sensing means, such as the tube 51 is connected to the control by lead 52 and transmits measurements of turbine discharge pressure thereto. An ambient pressure sensing means 53 transmits measurements of ambient pressure to the control by means of line 54. The control combines measurements of turbine discharge pressure and ambient pressure with the primary nozzle position signals to activate the pumps 36 and 43, thereby operating the actuators 31 and 39 to position the shroud flaps 12 and the shroud 19. The expansion ratio and spacing ratio are thereby varied independently as functions of primary nozzle setting and pressure ratio.

The embodiment of the invention shown in FIGURE 4 of the drawing is a semi-variable modification in which certain areas of performance are sacrificed for weight, ease of control and mechanical simplicity. In this embodiment, the nozzle flaps 11 and the shroud flaps 12 are interconnected as by brackets 56 and 57 and ring 58 passes through bracket 57 and received in the slot 59 in bracket 56. A link 61 is attached to the outer casing and to the bracket 57 by means of a ring 63 received within the slot 64. A single actuator 65 is connected to the outer casing as at 66 and to the shroud 19 as at 67. A control 68 combines measurements of rotor speed, throttle setting, compressor inlet temperature and turbine discharge temperature to activate the pump 69 which operates the actuator 65 to simultaneously position the nozzle flaps, the shroud flaps, and the shroud. In this case, link 61 holds the ring 63 fixed in position such that as the shroud 19 is moved away from the connection 62 bracket 57 rides along the ring 63 causing the ring 58 to slide downwardly in the slot 59, thus opening the shroud flaps and the nozzle flaps simultaneously. Actuator position signals are fed into the controls 68 by the position feed-back 71, thus permitting operation of the actuator within narrow limits. If desired, an additional actuator could be attached to the link 61 to provide more flexible operation of the flaps 11 and 12.

In the various embodiments illustrated, the operating or actuating mechanisms are shown in schematic and are by way of illustration only. In this regard it should be noted that the control parameters are also by way of illustration only and other related engine parameters may be selected if desired.

Various engine accessories which are required to be cooled may be placed in the secondary air passage 15 where they are cooled by the constant flow of secondary air. This accessory cooling without additional ducting is an important advantage of the present invention since the pumping action of the aerodynamic nozzle creates a flow of secondary air past the accessories at all times and insures an ample supply of cooling air without additional blower means.

Obviously many modifications and variations of the present invention are possible in light of the above teachings. It is therefore to be understood that within the scope of the appended claims, the invention may be practiced otherwise than as specifically described.

What we claim is:

1. For use with a reaction-type engine, an aerodynamic convergent-divergent jet nozzle in which the convergent portion is formed mechanically and the divergent portion is formed aerodynamically comprising: a primary variable area nozzle which defines the throat area of the convergent-divergent jet nozzle; a secondary variable area nozzle concentric with the primary nozzle which defines the exit area of the jet nozzle; a secondary air passage between the primary and secondary variable area nozzles; a secondary air source located upstream of said exit area and connected to said air passage to provide air of sufficient pressure to aerodynamically form the divergent portion of the convergent-divergent jet nozzle; and means operatively connected to said variable area primary nozzle and to said variable area secondary nozzle for relative adjustment of the nozzles to vary the expansion ratio and the spacing ratio of the aerodynamic convergent-divergent jet nozzle for optimum thrust characteristics over a wide range of subsonic and supersonic operating conditions.

2. An aerodynamic convergent-divergent jet nozzle for use in a reaction-type engine comprising: a primary variable area nozzle which defines the throat area and forms the convergent portion of the convergent-divergent jet nozzle; a shroud positioned concentrically with said primary nozzle and movable relative thereto; a secondary variable area nozzle connected to said shroud and defining the exit area of the jet nozzle; a secondary air intake located upstream of said exit area; a secondary air passage between the primary nozzle and the shroud and connected to said air intake for conducting secondary air under sufficient pressure to aerodynamically form the divergent portion of the convergent-divergent jet nozzle; and means operatively connected to the shroud and to the primary variable area nozzle and the secondary variable area nozzle for adjustment thereof, the adjustment of the secondary nozzle being in relation to the position of the primary nozzle so that the expansion ratio and spacing ratio of the aerodynamic convergent-divergent jet nozzle are variable to provide optimum thrust characteristics over a wide range of subsonic and supersonic operating conditions.

3. In combination with a reaction-type engine including a tailpipe surrounded by an outer casing, an aerodynamic convergent-divergent jet nozzle comprising: primary flaps pivotly connected to the tailpipe which define the throat area and form the convergent portion of the convergent-divergent jet nozzle; a shroud slidably mounted on the outer casing; shroud flaps pivotly connected to the shroud and defining the exit area of the jet nozzle; a secondary air source located upstream of said exit area; a secondary air passage between the primary flaps and the shroud and shroud flaps, said air passage receiving air from said air source for conducting secondary air under sufficient pressure to aerodynamically form the divergent portion of the convergent-divergent jet nozzle; and means operatively connected to the shroud, the primary flaps and the shroud flaps for adjusting the positions thereof, the adjustment of the secondary nozzle being in response to a plurality of engine parameters including the position of the primary flaps so that the expansion ratio and the spacing ratio of the aerodynamic convergent-divergent jet nozzles are variable to provide optimum thrust characteristics over a wide range of subsonic and supersonic operating conditions.

4. In combination with a reaction-type engine including a tailpipe and an outer casing, an aerodynamic convergent-divergent jet nozzle comprising; primary flaps pivotly connected to the rear edge of the tailpipe, said flaps forming the convergent portion of the jet nozzle and defining the throat area thereof; a first actuator operatively connected to the primary flaps; an annular shroud positioned concentrically with the tailpipe and mounted for sliding motion on the outer casing; a second actuator operatively connected to said shroud; a secondary air intake located upstream of said exit area; shroud flaps pivotly connected to the rear edge of the shroud defining the exit area of the jet nozzle; a third actuator operatively connected to said shroud flaps, a secondary air passage between the primary flaps and the shroud flaps, the secondary air in said passage being of sufficient pressure to aerodynamically form the divergent portion of the convergent-divergent jet nozzle; and control means operatively connected to each of said actuators for independent actuation thereof to adjust the relative positions of the shroud, the primary flaps and the shroud flaps and vary the expansion ratio and the spacing ratio of the jet nozzle to provide optimum thrust characteristics over a wide range of subsonic and supersonic operating conditions.

5. In combination with a reaction-type engine, an aerodynamic convergent-divergent jet nozzle comprising: a plurality of primary flaps forming the convergent portion of the convergent-divergent jet nozzle and defining the throat area thereof; actuator means operatively connected to said primary flaps for movement thereof; a plurality of secondary flaps being concentric with the primary flaps and spaced radially therefrom, said flaps being spaced axially with respect to the throat area to form the exit area of the jet nozzle; actuator means operatively connected to said secondary flaps for movement thereof; a secondary air passage between said primary and secondary flaps; an air intake located upstream of said throat area supplying air to said passage under sufficient pressure to create a wall of secondary air which forms the divergent portion of the convergent-divergent jet nozzle, said primary and secondary actuator means simultaneously adjusting the relative positions of said primary and secondary flaps to independently vary the expansion ratio and the spacing ratio of the aerodynamic convergent-divergent jet nozzle to provide optimum thrust characteristics over a wide range of subsonic and supersonic operating conditions.

6. In combination with a reaction-type engine including a tailpipe and an outer casing, an aerodynamic convergent-divergent jet nozzle comprising: primary flaps pivotly connected to the rear edge of the tailpipe which define the throat area and form the convergent portion of the aerodynamic convergent-divergent jet nozzle; shroud flaps pivotly connected to the rear edge of the outer casing and defining the exit area of the jet nozzle; a secondary air intake located upstream of said exit area; a secondary air passage between the primary flaps and the shroud flaps for conducting secondary air from said intake under sufficient pressure to create an air wall confined by said shroud flaps to form the divergent portion of the convergent-divergent jet nozzle; and means operatively connected to the primary flaps and to the shroud flaps for simultaneously adjusting the positions thereof to vary the expansion ratio and spacing ratio of the aerodynamic convergent-divergent jet nozzle to provide optimum thrust characteristics over a wide range of subsonic and supersonic operating conditions.

References Cited in the file of this patent

UNITED STATES PATENTS

| | | |
|---|---|---|
| 2,597,253 | Melchior | May 20, 1952 |
| 2,699,647 | Goebel | Jan. 18, 1955 |
| 2,744,381 | Geisel | May 8, 1956 |
| 2,778,190 | Bush | Jan. 22, 1957 |
| 2,796,731 | Morely et al. | June 25, 1957 |
| 2,870,600 | Brown | Jan. 27, 1959 |

FOREIGN PATENTS

| | | |
|---|---|---|
| 998,358 | France | Sept. 19, 1951 |
| 1,018,650 | France | Oct. 15, 1952 |
| 700,754 | Great Britain | Dec. 9, 1953 |